United States Patent
Mermoud et al.

(10) Patent No.: US 11,151,476 B2
(45) Date of Patent: Oct. 19, 2021

(54) LEARNING CRITICALITY OF MISCLASSIFICATIONS USED AS INPUT TO CLASSIFICATION TO REDUCE THE PROBABILITY OF CRITICAL MISCLASSIFICATION

(71) Applicant: Cisco Technology, Inc., San Jose, CA (US)

(72) Inventors: Grégory Mermoud, Veyras (CH); Jean-Philippe Vasseur, Saint Martin D'uriage (FR); Pierre-André Savalle, Rueil-Malmaison (FR)

(73) Assignee: Cisco Technology, Inc., San Jose, CA (US)

( * ) Notice: Subject to any disclaimer, the term of this patent is extended or adjusted under 35 U.S.C. 154(b) by 521 days.

(21) Appl. No.: 16/186,651

(22) Filed: Nov. 12, 2018

(65) Prior Publication Data

US 2020/0151622 A1    May 14, 2020

(51) Int. Cl.
*G06N 20/00* (2019.01)
*G06N 7/00* (2006.01)
*H04L 29/08* (2006.01)

(52) U.S. Cl.
CPC ............. *G06N 20/00* (2019.01); *G06N 7/005* (2013.01); *H04L 67/12* (2013.01)

(58) Field of Classification Search
CPC ........ G06N 20/00; G06N 7/005; H04L 67/12; H04L 67/303
See application file for complete search history.

(56) References Cited

U.S. PATENT DOCUMENTS

| | | | |
|---|---|---|---|
| 9,379,951 B2 | 6/2016 | Mihnev | |
| 9,836,696 B2 | 12/2017 | Vasseur et al. | |
| 2014/0222727 A1 | 8/2014 | Vasseur et al. | |
| 2016/0232353 A1 | 8/2016 | Gupta et al. | |
| 2017/0046510 A1 | 2/2017 | Chen et al. | |
| 2017/0279839 A1* | 9/2017 | Vasseur | H04L 63/1416 |
| 2018/0367428 A1* | 12/2018 | Di Pietro | H04L 63/1408 |
| 2019/0028909 A1* | 1/2019 | Mermoud | H04L 47/11 |
| 2019/0356553 A1* | 11/2019 | Mermoud | G06K 9/6268 |

* cited by examiner

*Primary Examiner* — Robert G Bachner
(74) *Attorney, Agent, or Firm* — Behmke Innovation Group LLC; Kenneth J. Heywood; Jonathon P. Western

(57) ABSTRACT

In one embodiment, a device classification service that uses a machine learning-based device type classifier to classify endpoint devices with device types, identifies a set of device types having similar associated traffic telemetry features. The service obtains, via one or more user interfaces, feedback indicative of whether the device type classifier misclassifying an endpoint device having a particular device type in the set with another device type in the set would be a critical misclassification. The service trains, using the obtained feedback, a prediction model to predict an impact of misclassifying the particular device type as one of the other device types in the set of device types. The service also retrains the machine learning-based device type classifier based on a prediction from the prediction model.

20 Claims, 7 Drawing Sheets

LEARNING CRITICALITY OF MISCLASSIFICATIONS USED AS INPUT TO CLASSIFICATION TO REDUCE THE PROBABILITY OF CRITICAL MISCLASSIFICATION

TECHNICAL FIELD

The present disclosure relates generally to computer networks, and, more particularly, to learning the criticality of misclassifications used as input to classification to reduce the probability of critical misclassification.

BACKGROUND

An emerging area of interest in the field of computer networking is the "Internet of Things" (IoT), which may be used by those in the art to refer to uniquely identifiable objects/things and their virtual representations in a network-based architecture. In particular, the next frontier in the evolution of the Internet is the ability to connect more than just computers and communications devices, but rather the ability to connect "objects" in general, such as lights, appliances, vehicles, window shades and blinds, doors, locks, etc.

As more non-traditional devices join the IoT, networks may eventually evolve from a bring-your-own-device (BYOD) model to a model that enables bring-your-own-thing (BYOT), bring-your-own-interface (BYOI), and/or bring-your-own-service (BYOS) paradigms. In other words, as the IoT grows, the number of available services, etc., will also grow considerably. For example, a single person in the future may transport sensor-equipped clothing, other portable electronic devices (e.g., cell phones, etc.), cameras, pedometers, or the like, into an enterprise environment, each of which may attempt to access the wealth of new IoT services that are available on the network.

From a networking perspective, the network can automatically configure access control policies, other security policies, and the like, if the device type of a particular IoT device is known to the network. For example, the network may limit a particular type of sensor to only communicating with its supervisory. However, with the ever-increasing number and variety of IoT devices, it may also be the case that the device type is not initially known to the network.

BRIEF DESCRIPTION OF THE DRAWINGS

The embodiments herein may be better understood by referring to the following description in conjunction with the accompanying drawings in which like reference numerals indicate identically or functionally similar elements, of which.

DESCRIPTION OF EXAMPLE EMBODIMENTS

Overview

Figure 1A:
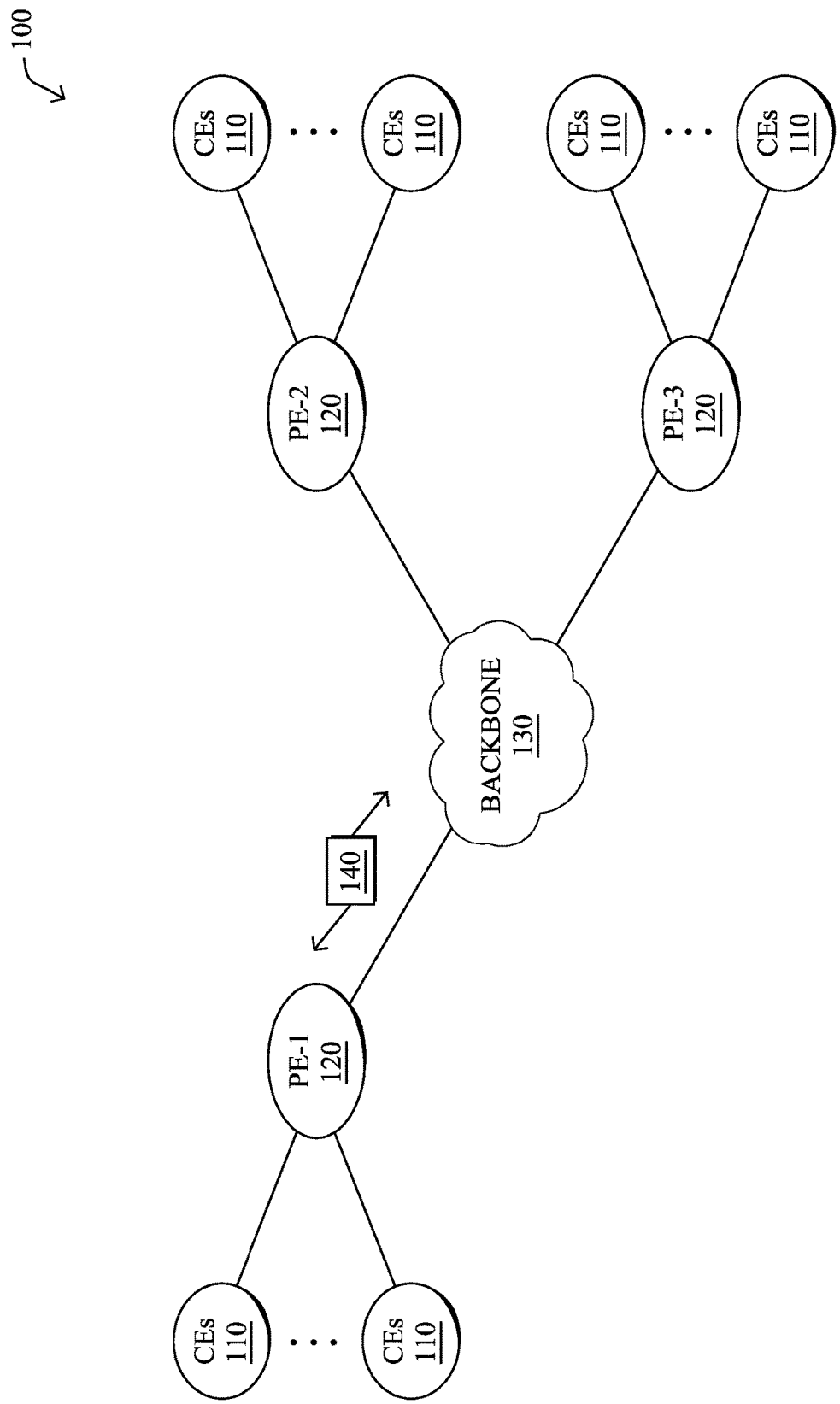
FIGS. 1A-1B illustrate an example communication network.

According to one or more embodiments of the disclosure, a device classification service that uses a machine learning-based device type classifier to classify endpoint devices with device types, identifies a set of device types having similar associated traffic telemetry features. The service obtains, via one or more user interfaces, feedback indicative of whether the device type classifier misclassifying an endpoint device having a particular device type in the set with another device type in the set would be a critical misclassification. The service trains, using the obtained feedback, a prediction model to predict an impact of misclassifying the particular device type as one of the other device types in the set of device types. The service also retrains the machine learning-based device type classifier based on a prediction from the prediction model.

Description

A computer network is a geographically distributed collection of nodes interconnected by communication links and segments for transporting data between end nodes, such as personal computers and workstations, or other devices, such as sensors, etc. Many types of networks are available, with the types ranging from local area networks (LANs) to wide area networks (WANs). LANs typically connect the nodes over dedicated private communications links located in the same general physical location, such as a building or campus. WANs, on the other hand, typically connect geographically dispersed nodes over long-distance communications links, such as common carrier telephone lines, optical lightpaths, synchronous optical networks (SONET), or synchronous digital hierarchy (SDH) links, or Powerline Communications (PLC) such as IEEE 61334, IEEE P1901.2, and others. The Internet is an example of a WAN that connects disparate networks throughout the world, providing global communication between nodes on various networks. The nodes typically communicate over the network by exchanging discrete frames or packets of data according to predefined protocols, such as the Transmission Control Protocol/Internet Protocol (TCP/IP). In this context, a protocol consists of a set of rules defining how the nodes interact with each other. Computer networks may further be interconnected by an intermediate network node, such as a router, to extend the effective "size" of each network.

Smart object networks, such as sensor networks, in particular, are a specific type of network having spatially distributed autonomous devices such as sensors, actuators, etc., that cooperatively monitor physical or environmental conditions at different locations, such as, e.g., energy/power consumption, resource consumption (e.g., water/gas/etc. for advanced metering infrastructure or "AMI" applications) temperature, pressure, vibration, sound, radiation, motion, pollutants, etc. Other types of smart objects include actuators, e.g., responsible for turning on/off an engine or perform any other actions. Sensor networks, a type of smart object network, are typically shared-media networks, such as wireless networks. That is, in addition to one or more sensors, each sensor device (node) in a sensor network may generally be equipped with a radio transceiver or other communication port, a microcontroller, and an energy source, such as a battery. Often, smart object networks are considered field area networks (FANs), neighborhood area networks (NANs), personal area networks (PANs), etc. Generally, size and cost constraints on smart object nodes (e.g., sensors) result in corresponding constraints on resources such as energy, memory, computational speed and bandwidth.

FIG. 1A is a schematic block diagram of an example computer network 100 illustratively comprising nodes/devices, such as a plurality of routers/devices interconnected by links or networks, as shown. For example, customer edge (CE) routers 110 may be interconnected with provider edge (PE) routers 120 (e.g., PE-1, PE-2, and PE-3) in order to communicate across a core network, such as an illustrative network backbone 130. For example, routers 110, 120 may be interconnected by the public Internet, a multiprotocol label switching (MPLS) virtual private network (VPN), or the like. Data packets 140 (e.g., traffic/messages) may be exchanged among the nodes/devices of the computer network 100 over links using predefined network communication protocols such as the Transmission Control Protocol/Internet Protocol (TCP/IP), User Datagram Protocol (UDP), Asynchronous Transfer Mode (ATM) protocol, Frame Relay protocol, or any other suitable protocol. Those skilled in the art will understand that any number of nodes, devices, links, etc. may be used in the computer network, and that the view shown herein is for simplicity.

In some implementations, a router or a set of routers may be connected to a private network (e.g., dedicated leased lines, an optical network, etc.) or a virtual private network (VPN), such as an MPLS VPN, thanks to a carrier network, via one or more links exhibiting very different network and service level agreement characteristics. For the sake of illustration, a given customer site may fall under any of the following categories:

1.) Site Type A: a site connected to the network (e.g., via a private or VPN link) using a single CE router and a single link, with potentially a backup link (e.g., a 3 G/4 G/LTE backup connection). For example, a particular CE router 110 shown in network 100 may support a given customer site, potentially also with a backup link, such as a wireless connection.

2.) Site Type B: a site connected to the network using two MPLS VPN links (e.g., from different service providers), with potentially a backup link (e.g., a 3 G/4 G/LTE connection). A site of type B may itself be of different types:

2a.) Site Type B1: a site connected to the network using two MPLS VPN links (e.g., from different service providers), with potentially a backup link (e.g., a 3 G/4 G/LTE connection).

2b.) Site Type B2: a site connected to the network using one MPLS VPN link and is one link connected to the public Internet, with potentially a backup link (e.g., a 3 G/4 G/LTE connection). For example, a particular customer site may be connected to network 100 via PE-3 and via a separate Internet connection, potentially also with a wireless backup link.

2c.) Site Type B3: a site connected to the network using two links connected to the public Internet, with potentially a backup link (e.g., a 3 G/4 G/LTE connection).

Notably, MPLS VPN links are usually tied to a committed service level agreement, whereas Internet links may either have no service level agreement at all or a loose service level agreement (e.g., a "Gold Package" Internet service connection that guarantees a certain level of performance to a customer site).

3.) Site Type C: a site of type B (e.g., types B1, B2 or B3) but with more than one CE router (e.g., a first CE router connected to one link while a second CE router is connected to the other link), and potentially a backup link (e.g., a wireless 3 G/4 G/LTE backup link). For example, a particular customer site may include a first CE router 110 connected to PE-2 and a second CE router 110 connected to PE-3.

Figure 1B:
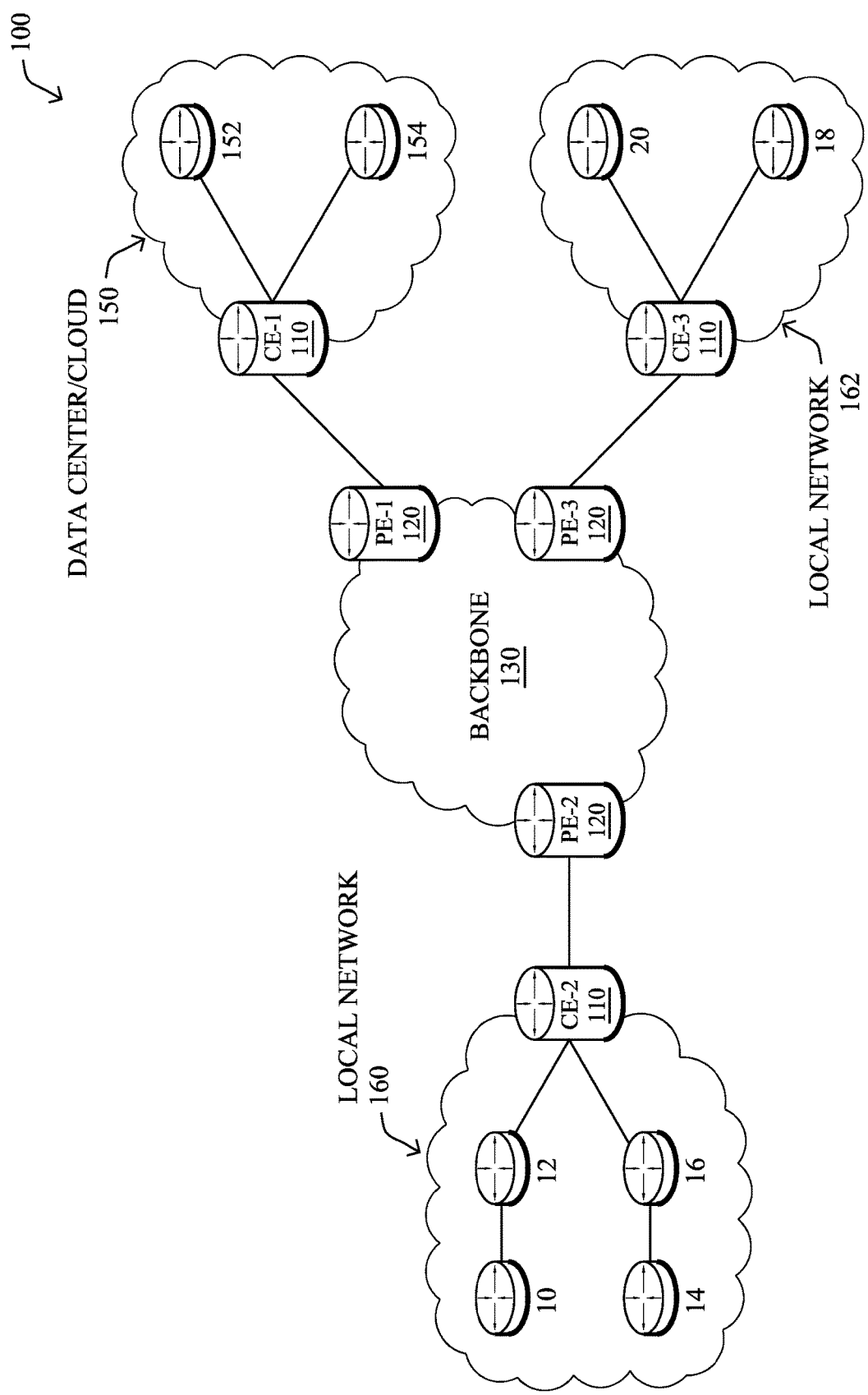

FIG. 1B illustrates an example of network 100 in greater detail, according to various embodiments. As shown, network backbone 130 may provide connectivity between devices located in different geographical areas and/or different types of local networks. For example, network 100 may comprise local networks 160, 162 that include devices/nodes 10-16 and devices/nodes 18-20, respectively, as well as a data center/cloud environment 150 that includes servers 152-154. Notably, local networks 160-162 and data center/cloud environment 150 may be located in different geographic locations.

Servers 152-154 may include, in various embodiments, a network management server (NMS), a dynamic host configuration protocol (DHCP) server, a constrained application protocol (CoAP) server, an outage management system (OMS), an application policy infrastructure controller (APIC), an application server, etc. As would be appreciated, network 100 may include any number of local networks, data centers, cloud environments, devices/nodes, servers, etc.

The techniques herein may also be applied to other network topologies and configurations. For example, the techniques herein may be applied to peering points with high-speed links, data centers, etc. Further, in various embodiments, network 100 may include one or more mesh networks, such as an Internet of Things network. Loosely, the term "Internet of Things" or "IoT" refers to uniquely identifiable objects/things and their virtual representations in a network-based architecture. In particular, the next frontier in the evolution of the Internet is the ability to connect more than just computers and communications devices, but rather the ability to connect "objects" in general, such as lights, appliances, vehicles, heating, ventilating, and air-conditioning (HVAC), windows and window shades and blinds, doors, locks, etc. The "Internet of Things" thus generally refers to the interconnection of objects (e.g., smart objects), such as sensors and actuators, over a computer network (e.g., via IP), which may be the public Internet or a private network.

Notably, shared-media mesh networks, such as wireless networks, etc., are often on what is referred to as Low-Power and Lossy Networks (LLNs), which are a class of network in which both the routers and their interconnect are constrained. In particular, LLN routers typically operate with highly constrained resources, e.g., processing power, memory, and/or energy (battery), and their interconnections are characterized by, illustratively, high loss rates, low data rates, and/or instability. LLNs are comprised of anything from a few dozen to thousands or even millions of LLN routers, and support point-to-point traffic (e.g., between devices inside the LLN), point-to-multipoint traffic (e.g., from a central control point such at the root node to a subset of devices inside the LLN), and multipoint-to-point traffic (e.g., from devices inside the LLN towards a central control point). Often, an IoT network is implemented with an LLN-like architecture. For example, as shown, local network 160 may be an LLN in which CE-2 operates as a root node for nodes/devices 10-16 in the local mesh, in some embodiments.

Figure 2:
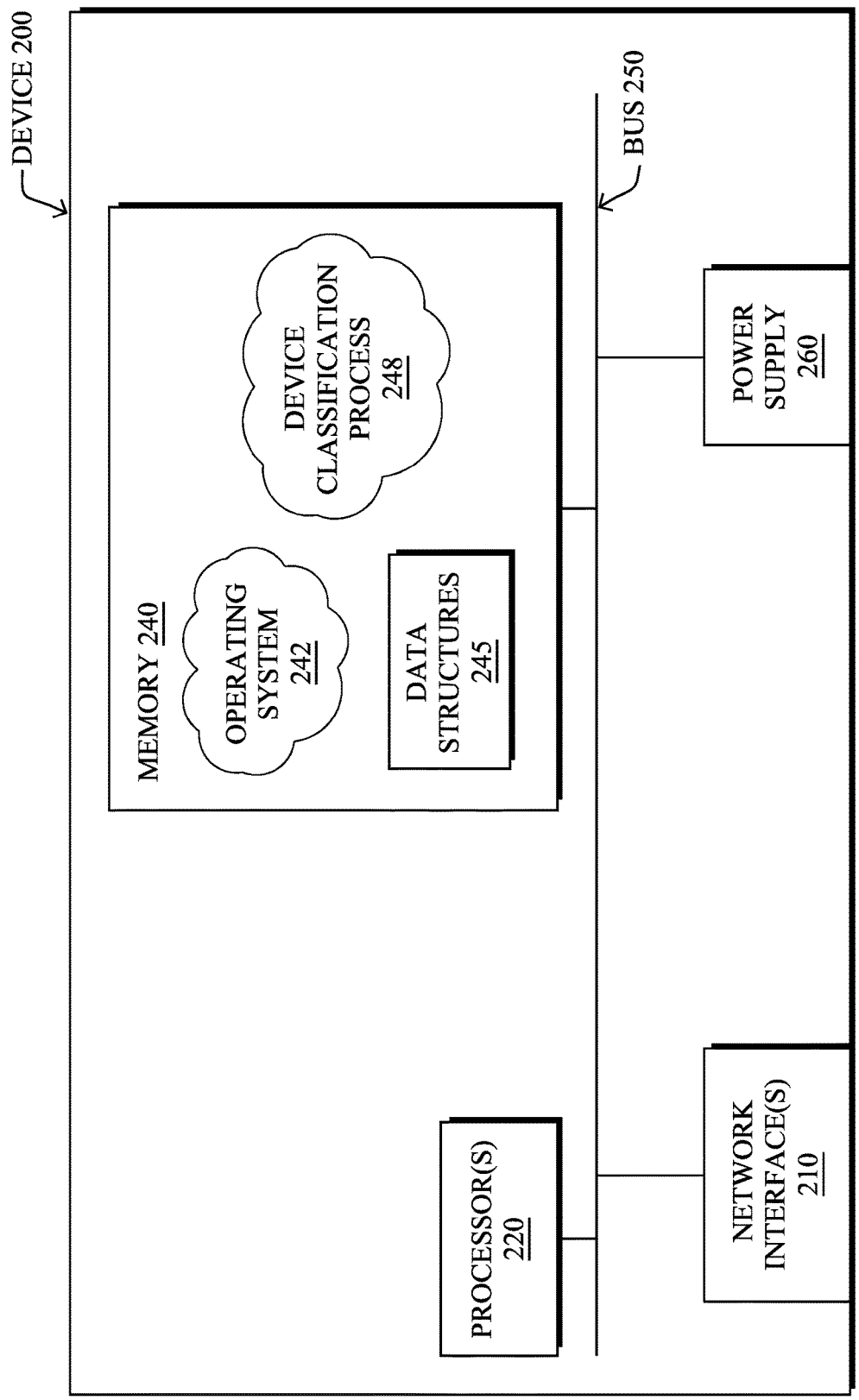
FIG. 2 illustrates an example network device/node.

FIG. 2 is a schematic block diagram of an example node/device 200 that may be used with one or more embodiments described herein, e.g., as any of the computing devices shown in FIGS. 1A-1B, particularly the PE routers 120, CE routers 110, nodes/device 10-20, servers 152-154 (e.g., a network controller located in a data center, etc.), any other computing device that supports the operations of network 100 (e.g., switches, etc.), or any of the other devices referenced below. The device 200 may also be any other suitable type of device depending upon the type of network architecture in place, such as IoT nodes, etc. Device 200 comprises one or more network interfaces 210, one or more processors 220, and a memory 240 interconnected by a system bus 250, and is powered by a power supply 260.

The network interfaces 210 include the mechanical, electrical, and signaling circuitry for communicating data over physical links coupled to the network 100. The network interfaces may be configured to transmit and/or receive data using a variety of different communication protocols. Notably, a physical network interface 210 may also be used to implement one or more virtual network interfaces, such as for virtual private network (VPN) access, known to those skilled in the art.

The memory 240 comprises a plurality of storage locations that are addressable by the processor(s) 220 and the network interfaces 210 for storing software programs and data structures associated with the embodiments described herein. The processor 220 may comprise necessary elements or logic adapted to execute the software programs and manipulate the data structures 245. An operating system 242 (e.g., the Internetworking Operating System, or IOS®, of Cisco Systems, Inc., another operating system, etc.), portions of which are typically resident in memory 240 and executed by the processor(s), functionally organizes the node by, inter alia, invoking network operations in support of software processors and/or services executing on the device. These software processors and/or services may comprise a device classification process 248.

It will be apparent to those skilled in the art that other processor and memory types, including various computer-readable media, may be used to store and execute program instructions pertaining to the techniques described herein. Also, while the description illustrates various processes, it is expressly contemplated that various processes may be embodied as modules configured to operate in accordance with the techniques herein (e.g., according to the functionality of a similar process). Further, while processes may be shown and/or described separately, those skilled in the art will appreciate that processes may be routines or modules within other processes.

In general, device classification process 248 may execute one or more machine learning-based classifiers to classify a device in a network, based on its corresponding network traffic. In one embodiment, device classification process 248 may assess captured telemetry data regarding one or more traffic flows involving the device, to determine the device type associated with the device. In further embodiments, device classification process 248 may classify the operating system of the device, based on its captured traffic telemetry data.

Device classification process 248 may employ any number of machine learning techniques, to classify the gathered telemetry data and apply a device type label to a device associated with the traffic. In general, machine learning is concerned with the design and the development of techniques that receive empirical data as input (e.g., telemetry data regarding traffic in the network) and recognize complex patterns in the input data. For example, some machine learning techniques use an underlying model M, whose parameters are optimized for minimizing the cost function associated to M, given the input data. For instance, in the context of classification, the model M may be a straight line that separates the data into two classes (e.g., labels) such that $M=a*x+b*y+c$ and the cost function is a function of the number of misclassified points. The learning process then operates by adjusting the parameters a,b,c such that the number of misclassified points is minimal. After this optimization/learning phase, device classification process 248 can use the model M to classify new data points, such as information regarding new traffic flows in the network. Often, M is a statistical model, and the cost function is inversely proportional to the likelihood of M, given the input data.

In various embodiments, device classification process 248 may employ one or more supervised, unsupervised, or semi-supervised machine learning models. Generally, supervised learning entails the use of a training set of data, as noted above, that is used to train the model to apply labels to the input data. For example, the training data may include sample telemetry data that is labeled as "iPhone 6," or "iOS 10.2." On the other end of the spectrum are unsupervised techniques that do not require a training set of labels. Notably, while a supervised learning model may look for previously seen patterns that have been labeled as such, an unsupervised model may attempt to analyze the data without applying a label to it. For example, supervised learning can be used to cluster devices that behave similarly to one another, based on their captured telemetry data. Semi-supervised learning models take a middle ground approach that uses a greatly reduced set of labeled training data.

Example machine learning techniques that device classification process 248 can employ may include, but are not limited to, nearest neighbor (NN) techniques (e.g., k-NN models, replicator NN models, etc.), statistical techniques (e.g., Bayesian networks, etc.), clustering techniques (e.g., k-means, mean-shift, etc.), neural networks (e.g., reservoir networks, artificial neural networks, etc.), support vector machines (SVMs), logistic or other regression, Markov models or chains, principal component analysis (PCA) (e.g., for linear models), multi-layer perceptron (MLP) ANNs (e.g., for non-linear models), replicating reservoir networks (e.g., for non-linear models, typically for time series), random forest classification, or the like.

The performance of a machine learning model can be evaluated in a number of ways based on the number of true positives, false positives, true negatives, and/or false negatives of the model. For example, the false positives of the model may refer to the number of traffic flows that are incorrectly classified as associated with a particular device type (e.g., make and/or model, version, operating system, etc.). Conversely, the false negatives of the model may refer to the number of traffic flows that the model incorrectly classifies as belonging to a certain device type. True negatives and positives may refer to the number of traffic flows that the model correctly classifies as not being of a certain class or being of a certain class, respectively. Related to these measurements are the concepts of recall and precision. Generally, recall refers to the ratio of true positives to the sum of true positives and false negatives, which quantifies the sensitivity of the model. Similarly, precision refers to the ratio of true positives the sum of true and false positives.

In some cases, device classification process 248 may assess the captured telemetry data on a per-flow basis. In other embodiments, device classification process 248 may assess telemetry data for a plurality of traffic flows based on any number of different conditions. For example, traffic flows may be grouped based on their sources, destinations, temporal characteristics (e.g., flows that occur around the same time or within the same time window, etc.), combinations thereof, or based on any other set of flow characteristics.

Figure 3:
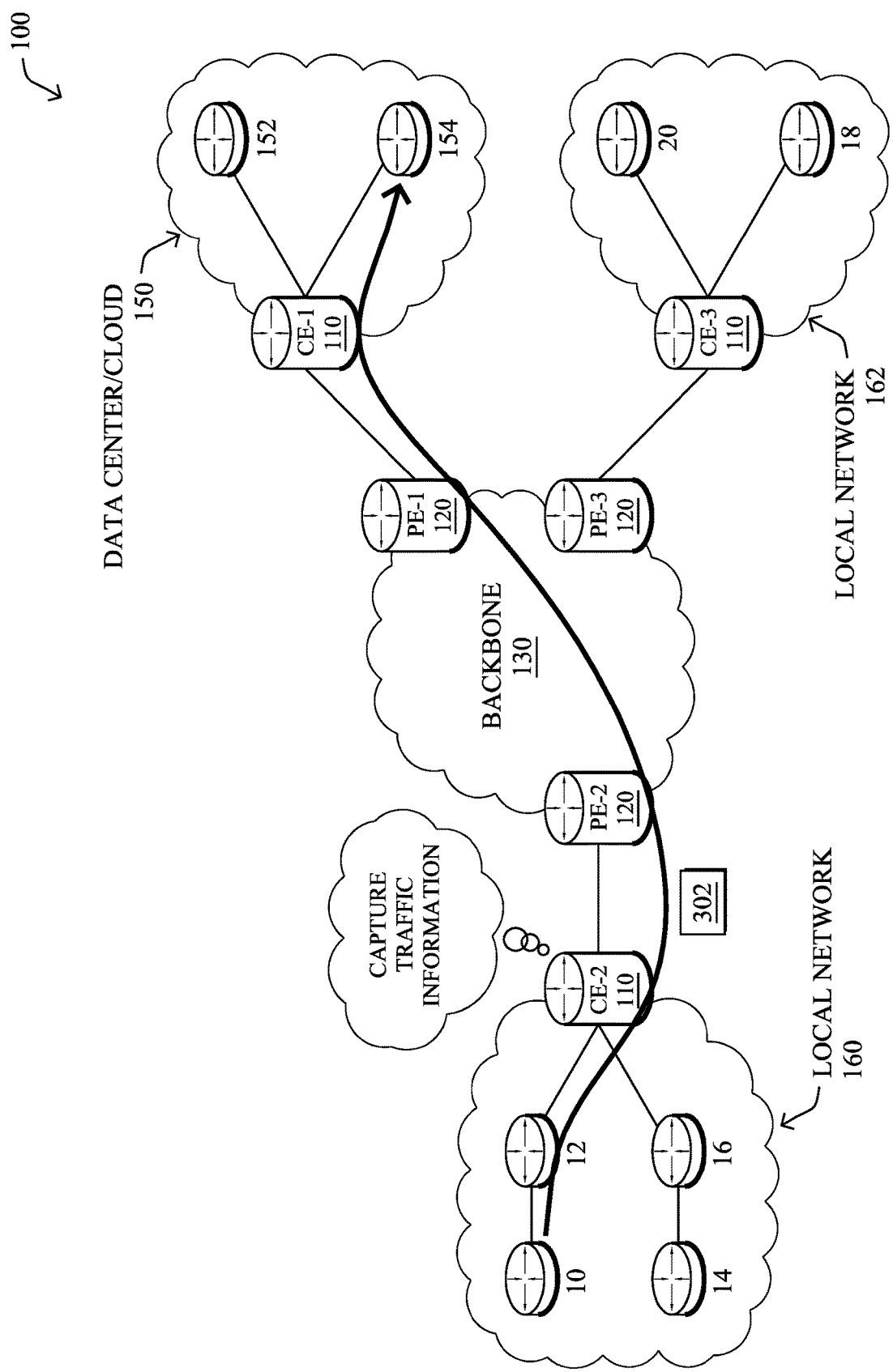
FIG. 3 illustrates an example of the capture of traffic telemetry data.

As shown in FIG. 3, various mechanisms can be leveraged to capture information about traffic in a network, such as telemetry data regarding a traffic flow. For example, consider the case in which client node 10 initiates a traffic flow with remote server 154 that includes any number of packets 302. Any number of networking devices along the path of the flow may analyze and assess packet 302, to capture telemetry data regarding the traffic flow. For example, as shown, consider the case of edge router CE-2 through which the traffic between node 10 and server 154 flows.

In some embodiments, a networking device may analyze packet headers, to capture feature information about the traffic flow. For example, router CE-2 may capture the source address and/or port of host node 10, the destination address and/or port of server 154, the protocol(s) used by packet 302, the hostname of server 154, and/or other header information by analyzing the header of a packet 302. Example captured features may include, but are not limited to, Transport Layer Security (TLS) information (e.g., from a TLS handshake), such as the ciphersuite offered, User Agent information, destination hostname, TLS extensions, etc., HTTP information (e.g., URI, etc.), Domain Name System (DNS) information, ApplicationID, virtual LAN (VLAN) ID, or any other data features that can be extracted from the observed traffic flow(s). Further information, if available could also include process hash information from the process on host node 10 that participates in the traffic flow.

In further embodiments, the device may also assess the payload of the packet to capture information about the traffic flow. For example, router CE-2 or another device may perform deep packet inspection (DPI) on one or more of packets 302, to assess the contents of the packet. Doing so may, for example, yield additional information that can be used to determine the application associated with the traffic flow (e.g., packets 302 were sent by a web browser of node 10, packets 302 were sent by a videoconferencing application, etc.).

The networking device that captures the flow telemetry data may also compute any number of statistics or metrics regarding the traffic flow. For example, CE-2 may determine the start time, end time, duration, packet size(s), the distribution of bytes within a flow, etc., associated with the traffic flow by observing packets 302.

Figure 4:
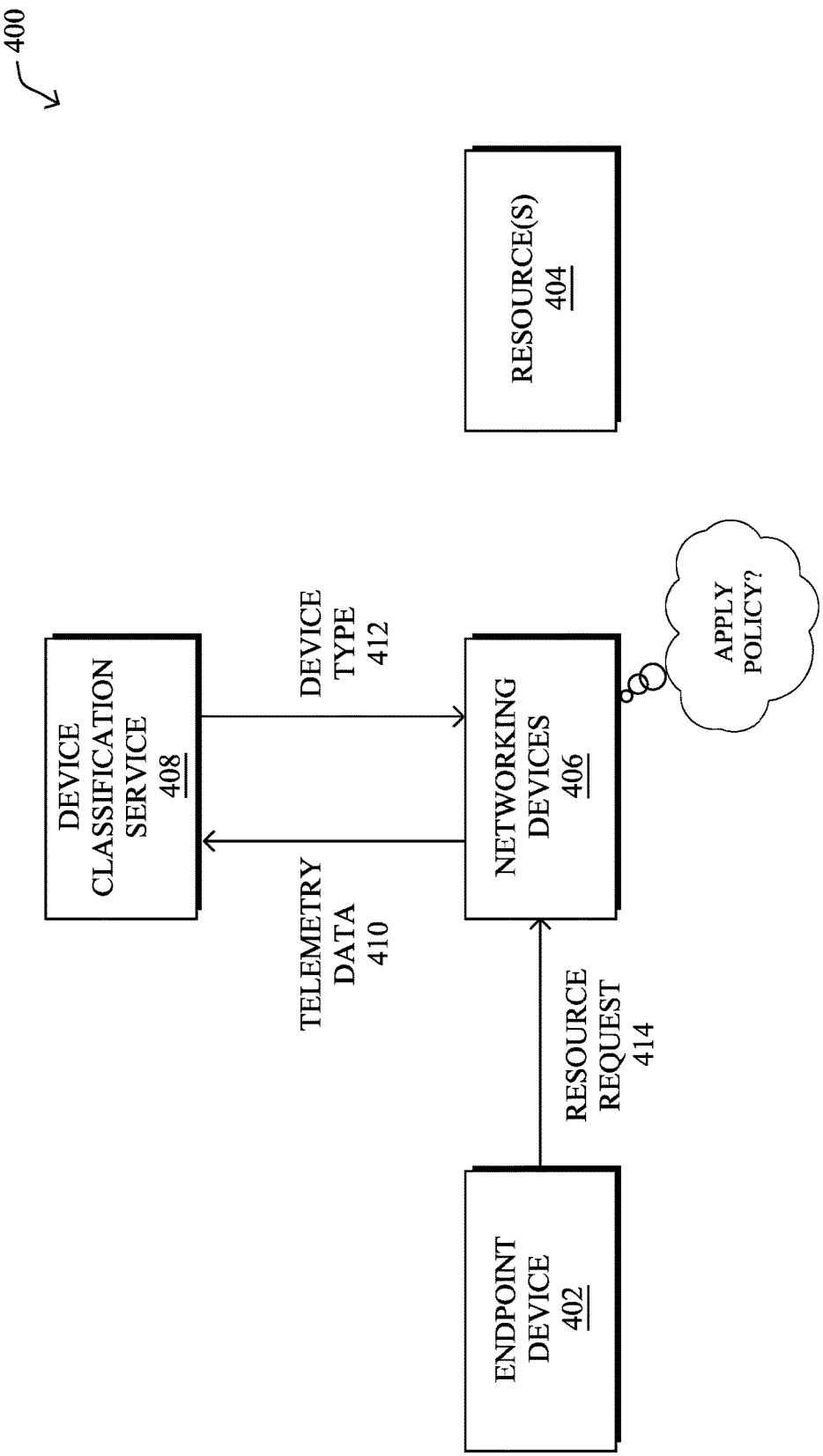
FIG. 4 illustrates an example of a device classification service in a network.

FIG. 4 illustrates an example of a device classification service in a network, in various embodiments. As shown, network 400 may generally include an endpoint device 402 (e.g., a user device, a sensor, an actuator, etc.), any number of resources 404, and any number of networking devices 406 that are configured to provide connectivity between endpoint device 402 and resource(s) 404. For example, networking devices 406 may include access points, wireless LAN controllers (WLCs), switches, routers, security devices (e.g., firewalls, etc.), access points (APs), and the like. Network resources 404 may include cloud-based services, specific servers or other endpoints, webpages, or any other resource with which endpoint device 402 could communicate.

Also as shown in FIG. 4 is a device classification service 408 that may be hosted on one or more of networking devices 406 or be in communication therewith. In general, device classification service 408 is configured to take as input telemetry data 410 captured by networking device 406 regarding network traffic associated with endpoint device 402 and, based on the captured telemetry, identify the device type 412 of endpoint device 402. For example, device type 412 may indicate the operating system (e.g., iOS, Android, etc.), manufacturer (e.g., Apple, Samsung, etc.), make (e.g., iPhone, etc.), model (e.g., 5s, 6, 7, etc.), function (e.g., thermostat, temperature sensor, etc.), or any other information that can be used to categorize endpoint device 402.

Note that the classification of endpoint device 402 by device classification service 408 can also, in some embodiments, be of varying specificity, depending on the telemetry data 410 available to service 408 and/or its degree of confidence in a particular classification. For example, device classification service 408 may determine, with a high degree of confidence, that endpoint device 402 is an Apple iPhone, but may or may not be able to determine whether device 402 is an iPhone 5s or an iPhone 6. Accordingly, in some embodiments, service 408 may also return the confidence values for the classification label(s) in device type 412 to networking device 406.

The labeling of endpoint device 402 with a device type 412 by device classification service 408 may initiate enforcement of one or more network policies by networking device 406 with respect to endpoint device 402. Such network policies may include, but are not limited to, security policies, network traffic or quality of service (QoS) policies, access polices, and the like. For example, as shown, assume that endpoint device 402 sends out a resource request 414 for a particular one of resources 404. In turn, networking devices 406 may determine whether to allow or block resource request 414 from reaching its target resource 404, based on the policy associated with the determined device type 412 of endpoint device 402. For example, if endpoint device 402 is determined to be a smart thermostat, it may be prevented from accessing certain online resources, such as an email service. Similarly, if endpoint device 402 is determined to be a safety-related sensor, a traffic or QoS policy associated with device type 412 may cause networking devices 406 to assign a higher priority to traffic from endpoint device 402.

In general, device classification (also known as "device profiling") to identify the device type of a device under scrutiny has traditionally used static rules and heuristics for the determination. In further embodiments, the device classification can be achieved by applying a trained machine learning-based classifier to the captured telemetry data for an endpoint device. Such telemetry can also take the form of information captured through active and/or passive probing of endpoint devices, to assign a device type and corresponding host profile to a device. Notably, this probing may entail sending any or all of the following probes:
DHCP probes with helper addresses
SPAN probes, to get messages in INIT-REBOOT and SELECTING states, use of ARP cache for IP/MAC binding, etc.
Netflow probes
HTTP probes to obtain information such as the OS of the device, Web browser information, etc.
RADIUS probes
SNMP to retrieve MIB object or receives traps
DNS probes to get the Fully Qualified Domain Name (FQDN)
etc.

A device classification service may even trigger active scanning of the network and SNMP scanning when the default community string is set to public. This can be done, for example, to retrieve the MAC address of the device or other types of information. Such a variety to probes allows for the gathering of a rich set of information that can be used for device profiling. A degree of confidence can also be assigned to any such device type classifications. Note also that the device profiling can be performed at multiple points in the network, such as by wireless LAN controllers (WLCs) in addition to, or in lieu of, a centralized service.

In many networks, the number of devices that fall into the 'UNKNOWN' device type category has been found to be as high as 40%. In other words, up to 40% of the devices on a given network may not match any existing device profiling rules in use. This is expected to grow over time, illustrating the need for a more dynamic device profiling approach. Indeed, it is estimated that the number of endpoint devices will reach 3.6 billion by 2021.

As noted above, networking devices 406 may apply any number of network policies to endpoint device 402, based on the device type 412 determined by device classification service 408. Accordingly, misclassification of endpoint device 402 by device classification service 408, i.e., applying the wrong device type label to endpoint device 402, can range from relatively innocuous to highly critical. For example, device classification service 408 confusing endpoint device 402 as an iPad instead of an iPhone may be relatively harmless. Conversely, device classification service 408 confusing an iPhone with an MRI machine can have quite disastrous consequences.

Unfortunately, it is not trivial to encode the impact of a misclassification in a machine learning-based classification system. Indeed, the impact of a given misclassification may be completely unknown, such that the performance metrics available to engineers and product managers do not account for these drastic differences. For example, assessing the precision or recall of a device type classifier does not tell the full story, as a small number of critical misclassifications may actually be worse than a larger number of benign misclassifications.

Learning Criticality of Misclassifications to Reduce the Probability of Critical Misclassification The techniques herein introduce a set of mechanisms to evaluate the impact of misclassifications via the use of crowd sourcing and machine learning. In some aspects, by carefully selecting sets of devices for which misclassifications are both likely and not well understood, the system can significantly improve the device classification by reducing the number of very consequential misclassifications and identifying potential issues in how policies are established.

Specifically, according to one or more embodiments of the disclosure as described in detail below, a device classification service that uses a machine learning-based device type classifier to classify endpoint devices with device types, identifies a set of device types having similar associated traffic telemetry features. The service obtains, via one or more user interfaces, feedback indicative of whether the device type classifier misclassifying an endpoint device having a particular device type in the set with another device type in the set would be a critical misclassification. The service trains, using the obtained feedback, a prediction model to predict an impact of misclassifying the particular device type as one of the other device types in the set of device types. The service also retrains the machine learning-based device type classifier based on a prediction from the prediction model.

Illustratively, the techniques described herein may be performed by hardware, software, and/or firmware, such as in accordance with the device classification process 248, which may include computer executable instructions executed by the processor 220 (or independent processor of interfaces 210) to perform functions relating to the techniques described herein.

Figure 5:
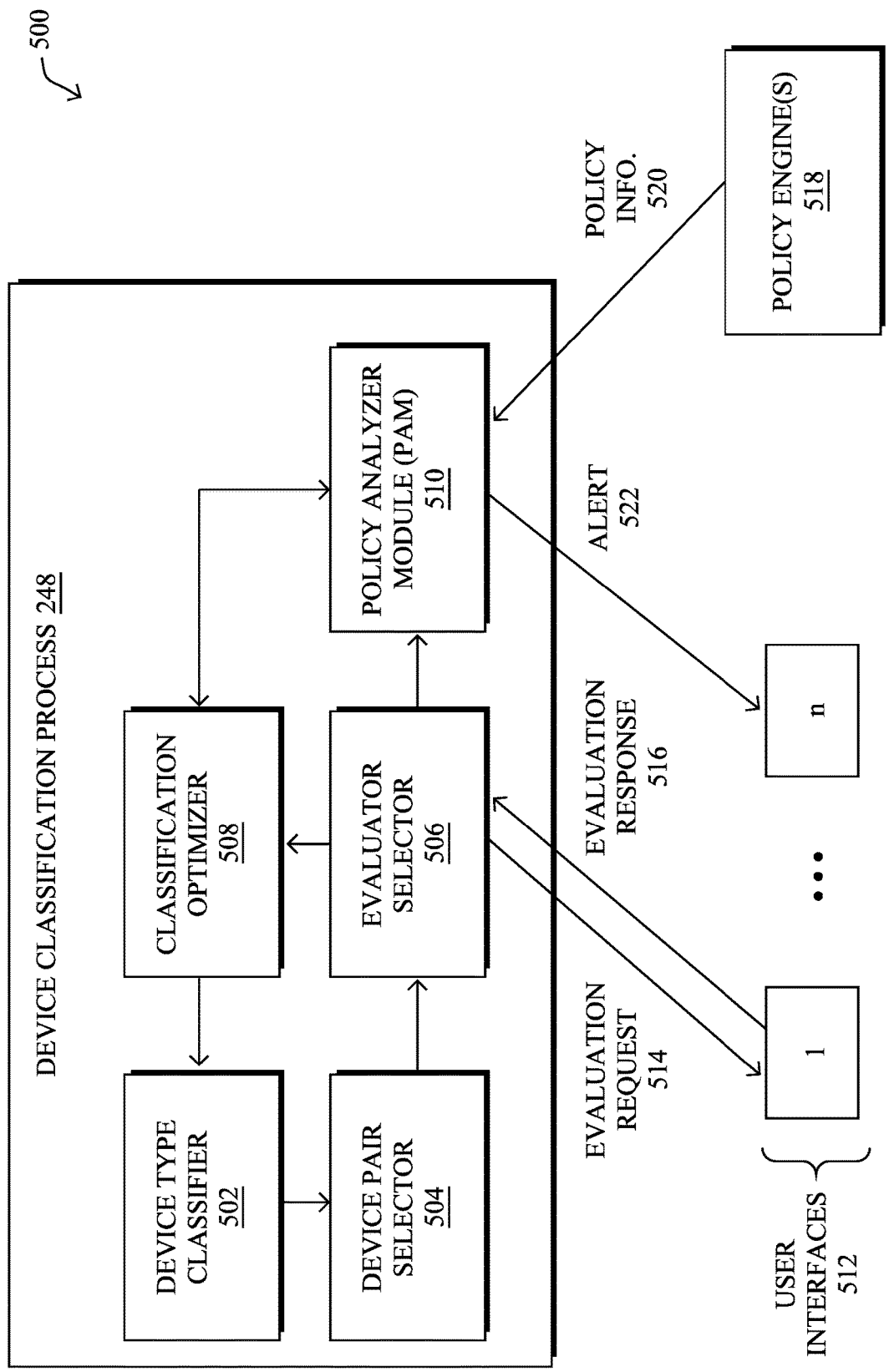
FIG. 5 illustrates an example architecture for learning the criticality of device type misclassifications.

Operationally, FIG. 5 illustrates an example architecture 500 for learning the criticality of device type misclassifications, according to various embodiments. As shown, device classification process 248, which may be used to provide a device classification service to one or more networks, may include any or all of the following components: a device type classifier 502, a device pair selector 504, an evaluator selector, a classification optimizer, and/or a policy analyzer module (PAM) 510. These components 502-510 may be implemented in a distributed manner or implemented on a single device. In addition, some or all of components 502-510 may be implemented as part of a monitored network (e.g., on a networking device) or part of a cloud-based service. The functionalities of the components of architecture 500 may also be combined, omitted, or implemented as part of other processes, as desired.

As shown, device classification process 248 may include a device type classifier 502. In various embodiments, classifier 502 may be a machine learning-based classifier that is trained using supervised learning to apply device type labels to endpoint devices in a network, based on telemetry captured regarding their traffic. Various classification approaches may be suitable to implement device type classifier 502 such as, but not limited to, support vector machines, decision trees and ensemble approaches (e.g., random forests), neural networking-based classifiers, hierarchical classifiers, and the like. Training data on which classifier 502 can be trained may be gathered and labeled either manually or, in some cases, by labeling captured telemetry data using existing device classification rules.

In general, the overall mechanism of architecture 500 is to evaluate the impact of misclassifications by device type classifier 502, by presenting carefully selected pairs of devices to selected users. For example, the users may be asked to assess the similarities of the pairs of devices or, in another embodiment, the impact of device type classifier 502 confusing the two device types. Note that the similarity assessment may be orthogonal to the impact of device type misclassification (e.g., two device may be somewhat similar with regards to the protocol being used, type of hardware, etc., yet they should not be classified as "similar", whereas the conversely is also true).

In various embodiments, device pair selector 504 may be configured to select relevant pairs of devices from the pool of device types on which device type classifier 502 was trained. For illustrative purposes only, device pair selector 504 is described herein as selecting pairs of devices/device types for assessment. However, further embodiments provide for selector 504 selecting a set of any number of device types for assessment. During execution, device pair selector 504 may perform a search for devices/device types that minimize the number of requests required to achieve a given information gain. For example, device pair selector 504 may select pairs of device types that fulfill two criteria: (1) they are likely to be misclassified as one another and (2) the impact of misclassifying them is not well known.

From a machine learning perspective, assume that device type classifier 502 is a multi-class classifier that takes as input vectors of measurements/characteristics from the captured traffic telemetry of the endpoint devices undergoing classification. In machine learning parlance, each measurement/characteristics is sometimes referred to as a 'feature' and the resulting vector referred to as a 'feature vector.' Each feature vector exists within what is known as the feature space of device type classifier 502 which, typically, is of very high dimensionality. Device type labels that are close to each other in the feature space will fulfill the first criterion above. On the other hand, the second criterion would be fulfilled by pairs of device types that are in regions of the feature space not yet explored by the system. In this way, device pair selector 504 may select pairs of devices from the feature space for further assessment.

In further embodiments, architecture 500 may also include an evaluation selector 506 that takes as input the sets, or pairs, of devices selected by device pair selector 504. In turn, evaluator selector 506 may builds a cohort of users that have such devices in their network to act as evaluators. For example, assume that there are any number of user interfaces 512 (e.g., a first through $n^{th}$ user interface) operated by network administrators or other expert users across any number of networks. If the device types selected by device pair selector 504 have been observed in any of those networks, evaluator selector 506 may select a corresponding user to act as an evaluator. For example, assume that the device pairs are 'iPhone 5s' and 'iPhone 7.' In such a case, evaluator selector 506 may select evaluators from networks in which both types of devices have been observed.

As shown, evaluator selector 506 may send an evaluation request 514 to the user interface(s) 512 of the evaluators selected by evaluator selector 506. Such a request may, in some embodiments, include the full context of the device types. In other words, evaluation request 514 may include the telemetry features/characteristics associated with each device type such as OUI information, protocol(s) being used, network location, etc.). Based on this information, the user may be asked to evaluate whether the devices are similar or not. In more sophisticated embodiments, evaluation request 514 may also request that the user specify whether the device type classifier misclassifying an endpoint device having a particular device type in the set with another device type in the set would be a critical misclassification. Note that in the latter case, the user may be asked to provide two evaluations, as confounding a device A typically attributed restricted network access with a device B with much broader access is a much more consequential mistake (from a security standpoint, at least) than confounding device B with A.

In response to evaluation request 514, the user may provide the requested feedback, which is sent back to device classification process 248 as an evaluation response 516. Preferably, evaluator selector 506 may select users across a plurality of different networks, so as to obtain a more diverse set of feedback regarding the pairs of devices/device types.

According to various embodiments, architecture 500 may also include a classification optimizer 508 that uses the feedback obtained via user interfaces 512 in order to optimize the classifications by device type classifier 502. However, one challenge is that the data collected by the operation of device pair selector 504 and evaluator selector 506 concerns multiple devices, whereas device type classifier 502 takes as input the telemetry data for a single device at a time. As a result, for any device, for any device type $D_i$, classification optimizer 508 may seek to estimate its overall criticality, by averaging the impact of misclassifying it with all other devices $D_j$, weighted by the probability of misclassification $P_m(D_i, D_j)$. To this end, in various embodiments, classification optimizer 508 may build a prediction model that predicts, for any device $D_j$, the impact of confounding $D_i$ with $D_j$.

The prediction model of classification optimizer 508 may be any suitable form of machine learning-based prediction model trained using the feedback obtained from the user interfaces 512. For example, classification optimizer 508 may train a regression model R that predicts, for any device $D_j$, the impact of confounding $D_i$ with $D_j$, using the feedback obtained from user interfaces 512. In turn, classification optimizer 508 may use the prediction model to systematically evaluate the impact of misclassifying $D_i$ with any of its neighboring devices in the feature space $F_C$ of device type classifier 502. The misclassification probabilities $P_m(D_i, D_j)$ can easily be estimated by cross-validating classifier 502.

Based on these predicted impacts of misclassifying one device type as another, classification optimizer 508 may retrain device type classifier 502, in various embodiments. For example, classification optimizer 508 may reweight training samples with their predicted criticality, therefore focusing the attention of device type classifier 502 on the most critical devices/device types. Of course, the retraining of device type classifier 502 may lead to new misclassification probabilities $P_m$ and therefore new criticality measures. In such cases, classification optimizer 508 may perform a sequence of such estimation-training steps for a fixed number of iterations or until convergence.

In some embodiments, architecture 500 may also include a policy analyzer module (PAM) 510 that uses the trained prediction model R from classification optimizer 508 to perform an automated analysis of network policies in place in the network(s) for which device classification process 248 performs classifications. In particular, PAM 510 may obtain policy information 520 from one or more policy engines 518 in the network(s), either on a pull or push basis. Such policies may generally associate device types with their allowed and/or disallowed activities in the network.

In some cases, PAM 510 may be implemented as part of device classification process 248 or as a separate service in communication therewith. In such cases, PAM 510 may optain policy information 520 from the on-premise policy engine 518, such as via an application programming interface (API). In other embodiments, PAM 510 may be hosted locally with policy engine 518. In that case, PAM 510 may instead receive the prediction model from classification optimizer 508. In both cases, PAM 510 will compare the predictions of the prediction model of classification optimizer 508 to the network policies associated with the device types under scrutiny, to ensure that the predicted criticality is accurate. In cases in which the predicted criticality does not match the existing network policies, PAM 510 may generate and send an alert 522 regarding this discrepancy to one of user interfaces 512 for further review by a network administrator.

By way of example of the operation of PAM 510, consider the pair of device types ($D_i$, $D_j$). Application of the prediction model R from classification optimizer 508 to this pair will result in a predicted impact of the misclassification of an endpoint device of type $D_i$ as being of type $D_j$. Such a prediction may be on a binary scale (e.g., critical vs. non-critical) or, in further cases, be on a sliding scale (e.g., on a criticality scale from 1-10, 0-1, etc.). Consider now the case in which misclassification between the pair of device types is predicted to be of high criticality, but both device types have the same network policy, according to policy information 520. In such a case, this may be an indication that one of the device types is assigned to the wrong network policy, and PAM 510 may send an alert 522 indicating this to a user. In other words, PAM 510 may operate as an additional check on the network policies in force in the network, to ensure that device type misclassification predicted to be critical is treated as such in the network.

Figure 6:
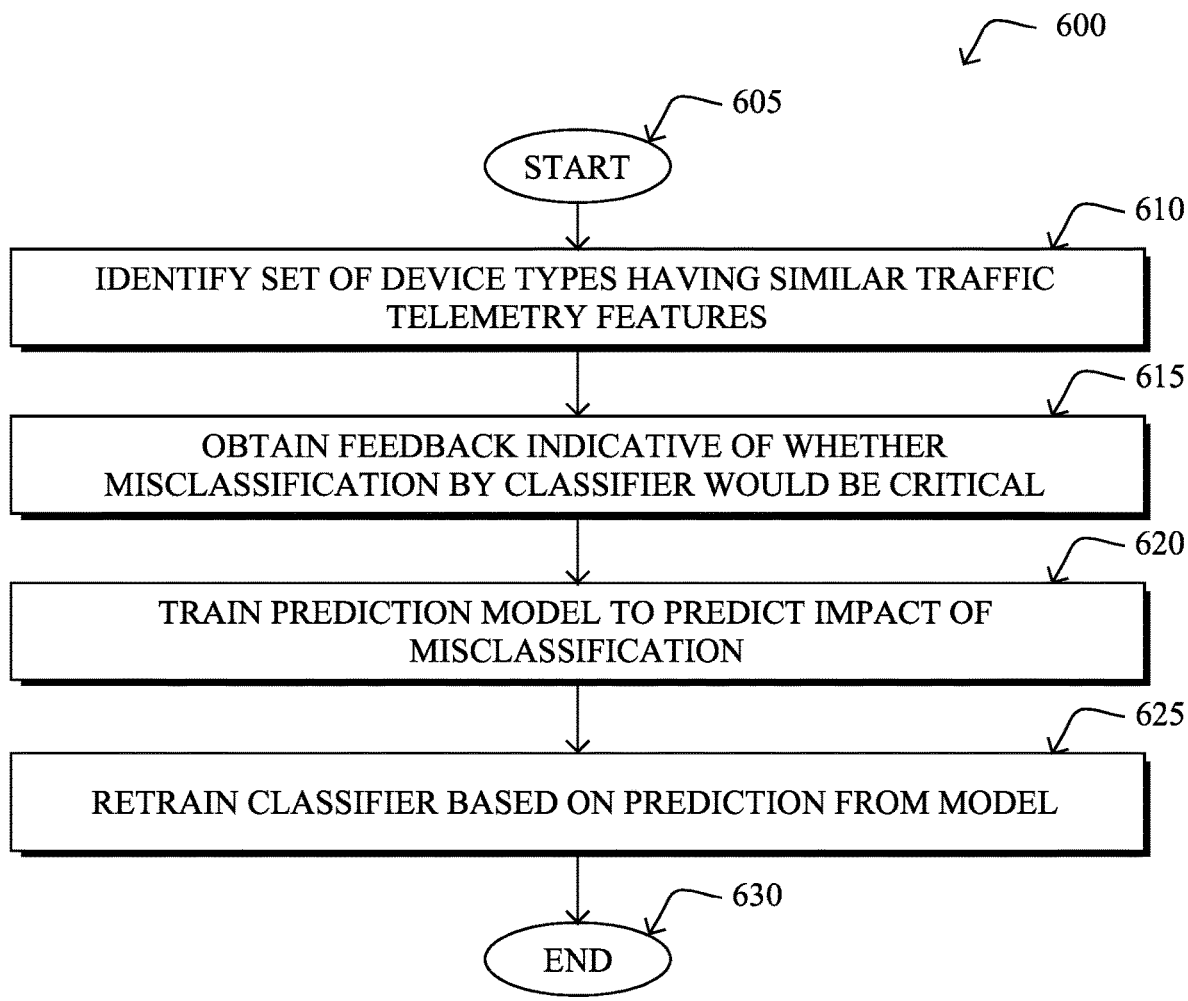
FIG. 6 illustrates an example simplified procedure for retraining a machine learning-based device type classifier.

FIG. 6 illustrates an example simplified procedure for retraining a machine learning-based device type classifier, in accordance with one or more embodiments described herein. For example, a non-generic, specifically configured device (e.g., device 200) may perform procedure 600 by executing stored instructions (e.g., process 248), to provide a device classification service to one or more networks. For example, the service may use a machine learning-based device type classifier to classify endpoint devices in the one or more networks with device types. The procedure 600 may start at step 605, and continues to step 610, where, as described in greater detail above, the device type classification service may identify a set of device types having similar associated traffic telemetry features. For example, the service may identify the device types in the set as being similar based on the proximities of their corresponding telemetry features in the feature space of the classifier of the service. In addition, in some embodiments, the service may further identify the device types in the set (e.g., a pair, a triplet, etc.) based in part on how well explored their portions of the feature space are.

At step 615, as detailed above, the device classification service may obtain, via one or more user interfaces, feedback indicative of whether the device type classifier misclassifying an endpoint device having a particular device type in the set with another device type in the set would be a critical misclassification. For example, the service may send an evaluation request to the one or more user interfaces that includes an indication of the particular device type, the other device type in the set, and their associated traffic telemetry features. In response, the service may receive an evaluation response to the evaluation request that indicates whether the device type classifier misclassifying an endpoint device having the particular device type in the set with the other device type would be a critical misclassification. In further embodiments, the evaluation request may also query the user as to whether the device types in the set are truly similar, from a real-world perspective. Indeed, certain devices may appear very similar from a telemetry feature perspective, but be very different in terms of manufacturers, functions, etc.

At step 620, the device classification service may train, using the obtained feedback, a prediction model to predict an impact of misclassifying the particular device type as one of the other device types in the set of device types, as described in greater detail above. Such a model may be, for example, a regression model that takes as input two or more devices/device types and outputs a measure of the criticality/impact of the device type classifier confusing the two. For example, the model may simply predict whether the misclassification would be a critical misclassification or a benign one. In further embodiments, the prediction model may assign a criticality weighting to the misclassification, based on the feedback obtained in step 625.

At step 625, as detailed above, the device classification service may retrain the machine learning-based device type classifier based on a prediction from the prediction model. For example, the device classification service may apply weights to a set of training data for retraining the device type classifier, with the weights being based on impacts of device type misclassifications predicted by the prediction model. Doing so may improve the classifications by the retrained classifier, so as to avoid making critical misclassifications. For example, the retraining may help the classifier to better distinguish between two device types or, in some cases, may cause the classifier to label an endpoint as 'unknown,' if the confidence of the classifier for a given classification is below a defined threshold. Using the retrained classifier, the service may use the retrained classifier to classify an endpoint device in one of the networks with one of the device types in the set and provide an indication of the classification of the endpoint device to a networking device in its network, thereby allowing the networking device to apply a network policy to the classified endpoint device based on the indication of the classification. Procedure 600 then ends at step 630.

It should be noted that while certain steps within procedure 600 may be optional as described above, the steps shown in FIG. 6 are merely examples for illustration, and certain other steps may be included or excluded as desired. Further, while a particular order of the steps is shown, this ordering is merely illustrative, and any suitable arrangement of the steps may be utilized without departing from the scope of the embodiments herein.

The techniques described herein, therefore, help to reduce the occurrences of critical misclassifications by a device type classifier by leveraging user feedback regarding which misclassifications are considered to be 'critical.' Since the device classifications are typically used to apply network policies to endpoint devices, a critical misclassification could otherwise result in an endpoint receiving the incorrect set of permissions on the network. In further aspects, the techniques herein also allow for users to be alerted to inconsistencies in the network polices for different device types, such as when their misclassifications are considered critical, but share the same or similar policies.

While there have been shown and described illustrative embodiments that provide for learning the criticality of device type classifications and leveraging this information to reduce their occurrences, it is to be understood that various other adaptations and modifications may be made within the spirit and scope of the embodiments herein. For example, while certain embodiments are described herein with respect to using certain models for purposes of device type classification, the models are not limited as such and may be used for other functions, in other embodiments. In addition, while certain protocols are shown, other suitable protocols may be used, accordingly.

The foregoing description has been directed to specific embodiments. It will be apparent, however, that other variations and modifications may be made to the described embodiments, with the attainment of some or all of their advantages. For instance, it is expressly contemplated that the components and/or elements described herein can be implemented as software being stored on a tangible (non-transitory) computer-readable medium (e.g., disks/CDs/RAM/EEPROM/etc.) having program instructions executing on a computer, hardware, firmware, or a combination thereof. Accordingly, this description is to be taken only by way of example and not to otherwise limit the scope of the embodiments herein. Therefore, it is the object of the appended claims to cover all such variations and modifications as come within the true spirit and scope of the embodiments herein.

What is claimed is:

1. A method comprising:
   identifying, by a device classification service that uses a machine learning-based device type classifier to classify endpoint devices with device types, a set of device types having similar associated traffic telemetry features;
   obtaining, by the device classification service and via one or more user interfaces, feedback indicative of whether the device type classifier misclassifying an endpoint device having a particular device type in the set with another device type in the set would be a critical misclassification;
training, by the device classification service and using the obtained feedback, a prediction model to predict an impact of misclassifying the particular device type as one of the other device types in the set of device types; and
retraining, by the device classification service, the machine learning-based device type classifier based on a prediction from the prediction model.

2. The method as in claim 1, wherein the device types in the set are indicative of one or more of: a device manufacturer, a device model, or a device operating system.

3. The method as in claim 1, further comprising:
classifying, by the device classification service and using the retrained device type classifier, an endpoint device in a network with one of the device types in the set; and
providing, by the device classification service, an indication of the classification of the endpoint device in the network to a networking device in the network, wherein the networking device applies a network policy to the classified endpoint device based on the indication of the classification.

4. The method as in claim 1, further comprising:
comparing a prediction by the prediction model of the impact of misclassifying the particular device type as one of the other device types in the set to network policies from a policy engine regarding the particular device type and the other device type; and
generating an alert when the particular and other device types have the same network policy and the prediction model predicts a high impact of misclassifying the particular device type as the other device type.

5. The method as in claim 1, wherein retraining the machine learning-based device type classifier based on a prediction from the prediction model comprises:
applying weights to a set of training data for retraining the device type classifier, wherein the weights are based on impacts of device type misclassifications predicted by the prediction model.

6. The method as in claim 1, wherein the prediction model is a machine learning-based regression model.

7. The method as in claim 1, wherein obtaining, by the device classification service and via the one or more user interfaces, the feedback indicative of whether the device type classifier misclassifying an endpoint device having a particular device type in the set with another device type in the set would be a critical misclassification comprises:
sending an evaluation request to the one or more user interfaces that includes an indication of the particular device type, the other device type in the set, and their associated traffic telemetry features; and
receiving an evaluation response to the evaluation request that indicates whether the device type classifier misclassifying an endpoint device having the particular device type in the set with the other device type would be a critical misclassification.

8. The method as in claim 7, wherein the evaluation response further indicates whether the particular device type and the other device type are similar.

9. The method as in claim 1, wherein the device classification service is a cloud-based service and wherein the one or more user interfaces are associated with a plurality of different networks that use the device classification service.

10. An apparatus, comprising:
one or more network interfaces to communicate with a network;
a processor coupled to the network interfaces and configured to execute one or more processes; and
a memory configured to store a process executable by the processor, the process when executed configured to:
identify a set of device types having similar associated traffic telemetry features, wherein the apparatus uses a machine learning-based device type classifier to classify endpoint devices with device types from the set;
obtain, via one or more user interfaces, feedback indicative of whether the device type classifier misclassifying an endpoint device having a particular device type in the set with another device type in the set would be a critical misclassification;
train, using the obtained feedback, a prediction model to predict an impact of misclassifying the particular device type as one of the other device types in the set of device types; and
retrain the machine learning-based device type classifier based on a prediction from the prediction model.

11. The apparatus as in claim 10, wherein the device types in the set are indicative of one or more of: a device manufacturer, a device model, or a device operating system.

12. The apparatus as in claim 10, wherein the process when executed is further configured to:
classify, using the retrained device type classifier, an endpoint device in a network with one of the device types in the set; and
provide an indication of the classification of the endpoint device in the network to a networking device in the network, wherein the networking device applies a network policy to the classified endpoint device based on the indication of the classification.

13. The apparatus as in claim 10, wherein the process when executed is further configured to:
compare a prediction by the prediction model of the impact of misclassifying the particular device type as one of the other device types in the set to network policies from a policy engine regarding the particular device type and the other device type; and
generate an alert when the particular and other device types have the same network policy and the prediction model predicts a high impact of misclassifying the particular device type as the other device type.

14. The apparatus as in claim 10, wherein the apparatus retrains the machine learning-based device type classifier based on a prediction from the prediction model by:
applying weights to a set of training data for retraining the device type classifier, wherein the weights are based on impacts of device type misclassifications predicted by the prediction model.

15. The apparatus as in claim 10, wherein the prediction model is a machine learning-based regression model.

16. The apparatus as in claim 10, wherein the apparatus obtains, via the one or more user interfaces, the feedback indicative of whether the device type classifier misclassifying an endpoint device having a particular device type in the set with another device type in the set would be a critical misclassification by:
sending an evaluation request to the one or more user interfaces that includes an indication of the particular device type, the other device type in the set, and their associated traffic telemetry features; and receiving an evaluation response to the evaluation request that indicates whether the device type classifier misclassifying an endpoint device having the particular device type in the set with the other device type would be a critical misclassification.

17. The apparatus as in claim 16, wherein the evaluation response further indicates whether the particular device type and the other device type are similar.

18. The apparatus as in claim 10, wherein the apparatus provides a cloud-based device classification service to a plurality of different networks, and wherein the one or more user interfaces are associated with the plurality of different networks.

19. A tangible, non-transitory, computer-readable medium storing program instructions that cause a device classification service to execute a process comprising:

identifying, by a device classification service that uses a machine learning-based device type classifier to classify endpoint devices with device types, a set of device types having similar associated traffic telemetry features;

obtaining, by the device classification service and via one or more user interfaces, feedback indicative of whether the device type classifier misclassifying an endpoint device having a particular device type in the set with another device type in the set would be a critical misclassification;

training, by the device classification service and using the obtained feedback, a prediction model to predict an impact of misclassifying the particular device type as one of the other device types in the set of device types; and retraining, by the device classification service, the machine learning-based device type classifier based on a prediction from the prediction model.

20. The computer-readable medium as in claim 19, wherein the device types in the set are indicative of one or more of: a device manufacturer, a device model, or a device operating system.

* * * * *

UNITED STATES PATENT AND TRADEMARK OFFICE
CERTIFICATE OF CORRECTION

PATENT NO. : 11,151,476 B2
APPLICATION NO. : 16/186651
DATED : October 19, 2021
INVENTOR(S) : Grégory Mermoud et al.

Page 1 of 1

It is certified that error appears in the above-identified patent and that said Letters Patent is hereby corrected as shown below:

In the Specification

Column 3, Line 48, should read:
one MPLS VPN link and one link connected to the public Signed and Sealed this
Eighteenth Day of January, 2022

Drew Hirshfeld
*Performing the Functions and Duties of the*
*Under Secretary of Commerce for Intellectual Property and*
*Director of the United States Patent and Trademark Office*